United States Patent [19]

Kazlauskas

[11] Patent Number: 4,896,812

[45] Date of Patent: Jan. 30, 1990

[54] DOUBLE DOWNHILL PIPE WELDER

[76] Inventor: Gasparas Kazlauskas, 1134 Tower Rd., Beverly Hills, Calif. 90210

[21] Appl. No.: 319,061

[22] Filed: Mar. 6, 1989

Related U.S. Application Data

[63] Continuation-in-part of Ser. No. 261,140, Oct. 24, 1988, abandoned.

[51] Int. Cl.⁴ ............ B23K 9/02; B23K 9/06; B23K 9/225
[52] U.S. Cl. ............................ 228/32; 228/8; 228/12; 228/49.3; 219/60 A; 219/61.5; 219/130.4
[58] Field of Search ............ 219/130 A, 60 A, 61.5, 219/59.1, 61; 228/9, 12, 32, 48, 8, 49.3

[56] References Cited

U.S. PATENT DOCUMENTS

| | | | |
|---|---|---|---|
| 2,516,037 | 7/1950 | Williams | 219/130.4 |
| 2,798,937 | 7/1957 | Miller | 219/130.4 |
| 2,894,111 | 7/1959 | McNutt | 219/60 A |
| 3,748,426 | 7/1973 | Stanley | 219/60 A |
| 4,365,132 | 12/1982 | Kazlauskas et al. | 219/60 A |
| 4,373,125 | 2/1983 | Kazlauskas | 219/60 A |

FOREIGN PATENT DOCUMENTS

| | | | |
|---|---|---|---|
| 26243 | 3/1978 | Japan | 219/60 A |
| 155148 | 12/1979 | Japan | 219/601 |
| 979353 | 1/1965 | United Kingdom | 219/130.4 |

Primary Examiner—Nicholas P. Godici
Assistant Examiner—Samuel M. Heinrich
Attorney, Agent, or Firm—Jack C. Munro

[57] ABSTRACT

A pipe welding apparatus which utilizes a pair of welding electrodes which are at least ninety degrees spaced apart relative to a cylindrical workpiece. The welding procedure only occurs during movement of each welding electrode from an upper position to a lower position.

5 Claims, 6 Drawing Sheets

DOUBLE DOWNHILL PIPE WELDER

REFERENCE TO PRIOR APPLICATION

This application is a continuation-in-part of U.S. patent application Ser. No. 07/261,140, filed Oct. 24, 1988, by the same inventor and by the same title, now abandoned.

BACKGROUND OF THE INVENTION

The field of this invention has to do with pipe welders and more particularly to a pipe welder which is specifically adapted to make high quality welds within thin walled piping.

One common use of thin wall piping has to do with muffler systems for internal combustion engines. Such muffler systems are in widespread use in conjunction with motor vehicles. A muffler system includes the muffler with piping extending to the input side of the muffler and with piping extending from the output side of the muffler. This piping is constructed of thin walled material which is usually steel. Also, this piping is normally not straight, that is, not extending in a straight line from the input side of the muffler and from the output side of the muffler. This piping normally is bent in numerous specific bends so that when placed in conjunction with the undercarriage of the motor vehicle, that this piping will be located in specific areas and not interfere with operating parts of the motor vehicle. It is normal that this piping is threaded through empty spaces located within the undercarriage of the motor vehicle.

This threading of this piping through the undercarriage generally results in the forming of a plurality of piping joints. Each piping joint must be totally sealed. Sealing by using of adhesive or rubber seals have a tendency to deteriorate in time. It is important in the constructing of a muffler system that all seals be one hundred percent effective (no leakage) and will not deteriorate as the years go by. A leaky muffler system can be a health hazard to the occupants of the motor vehicle. Also, in this day and age, it is against environmental regulations to have motor vehicle engine exhaust discharged directly into the atmosphere without passing through the muffler system which generally includes a catalytic converter. The reason for this is to diminish the pollution of the air.

In order to produce the most effective seal, the common technique is to weld each joint within the muffler system. However, this welding has to be carefully accomplished because of the thin walled construction of the muffler piping. In the past, it has been common to accomplish this welding manually. However, manually frequently causes the production of inferior welds with these welds producing leakage. Also, it is very easy to create a "hotspot" in the welding procedure which will result in creating of a hole through the muffler piping which results in an unusable product. It has been common that the rejection rate in conjunction with the construction of muffler piping by using of a manual welding technique is approximately twenty percent. This constructing of the muffler piping is in conjunction with the motor vehicle assembly line.

It has been known to use automatic welding equipment to weld pipes. This type of equipment is commonly used in conjunction with pipes of all kinds with generally the side walls of these pipes being greater in thickness than the piping side wall in conjunction with the muffler system. Because of the thin walled nature of muffler piping, the automatic welding is far more difficult than with most piping.

The common procedure in conjunction with an automatic welding device is that a welding electrode is moved three hundred sixty degrees around the weld joint creating a desirable weld. It has been found that in moving of the welding electrode in the downward direction, that is along with the direction of the pull of gravity, that a satisfactory weld is produced. However, when the welding electrode begins to move in a direction against the pull of gravity, the weld bead tends to "puddle" creating "hotspots" resulting in the creating of holes within the piping. Therefore, it has been found that the typical automatic welding procedure has not been satisfactory when used in conjunction with muffler piping.

SUMMARY OF THE INVENTION

The structure of the present invention relates to an automatic welding apparatus for muffler piping and other similar types of thin walled piping wherein the automatic welding occurs only in a downward direction from a higher elevation to a lower elevation. There is utilized two separate welding electrodes located at least ninety degrees apart relative to the piping. In one arrangement the welding electrodes may be located diametrically apart. In this arrangement, one of the welding electrodes is started at the uppermost point of the weld joint and is moved clockwise one hundred eighty degrees completing the weld along this portion of the joint. When performing this movement, the other welding electrode is deactivated and has now been moved to the position to this uppermost point and it is now activated and the first welding electrode deactivated. This now activated other welding electrode is moved counterclockwise one hundred eighty degrees completing that portion of the weld joint. All the welding has occurred in a downward direction. Therefore, there is no tendency for any hotspots to be created which can create holes in the piping and, therefore, an unusable part. The actual welding procedure is precisely controlled through the use of a computer which is deemed to be conventional in conjunction with automatic welding equipment. The welding head is capable of slight adjustment toward and away from the piping so to insure that firm contact is always made in conjunction with the piping.

In another arrangement, the welding electrodes are located ninety degrees from each other. Both of these welding electrodes are activated simultaneously with each welding electrode welding a ninety degree arc of the circular weld bead. Each welding electrode will be operated twice to form the circular weld bead. In each arrangement there may be included a pilot welding electrode in close association with each welding electrode.

The primary objective of the present invention is to construct an automatic welding apparatus which is capable of creating high quality welds within thin walled piping substantially decreasing the number of rejects in conjunction with the piping.

DETAILED DESCRIPTION OF THE SHOWN EMBODIMENT

Figures 1, 2:
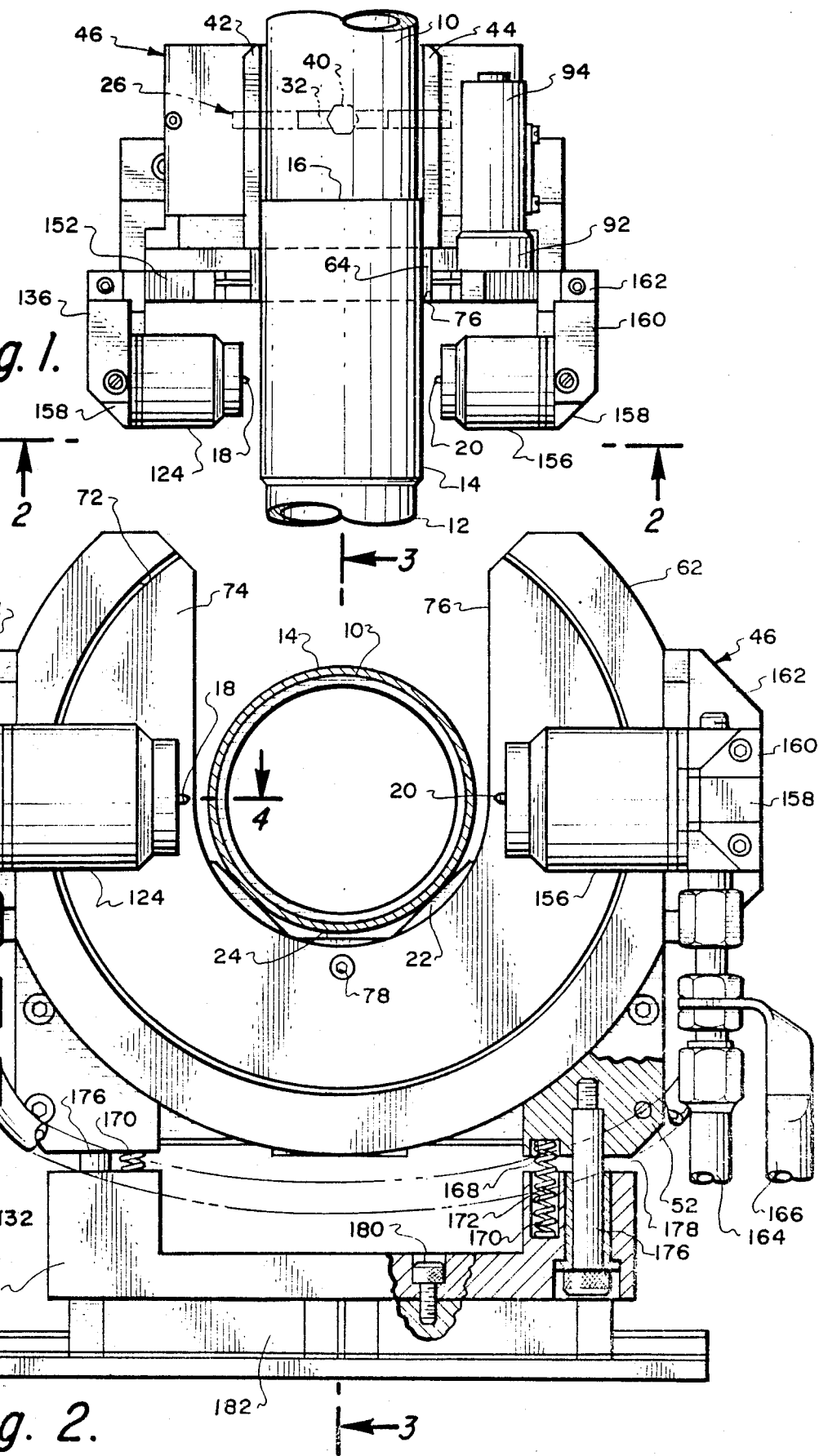
FIG. 1 is a top plan view of the welding apparatus of the present invention showing a muffler piping mounted in conjunction therewith.
FIG. 2 is a front view of the welding apparatus of the present invention taken along line 2—2 of FIG. 1 with this view also being partly in cross-section.
Figure 3:
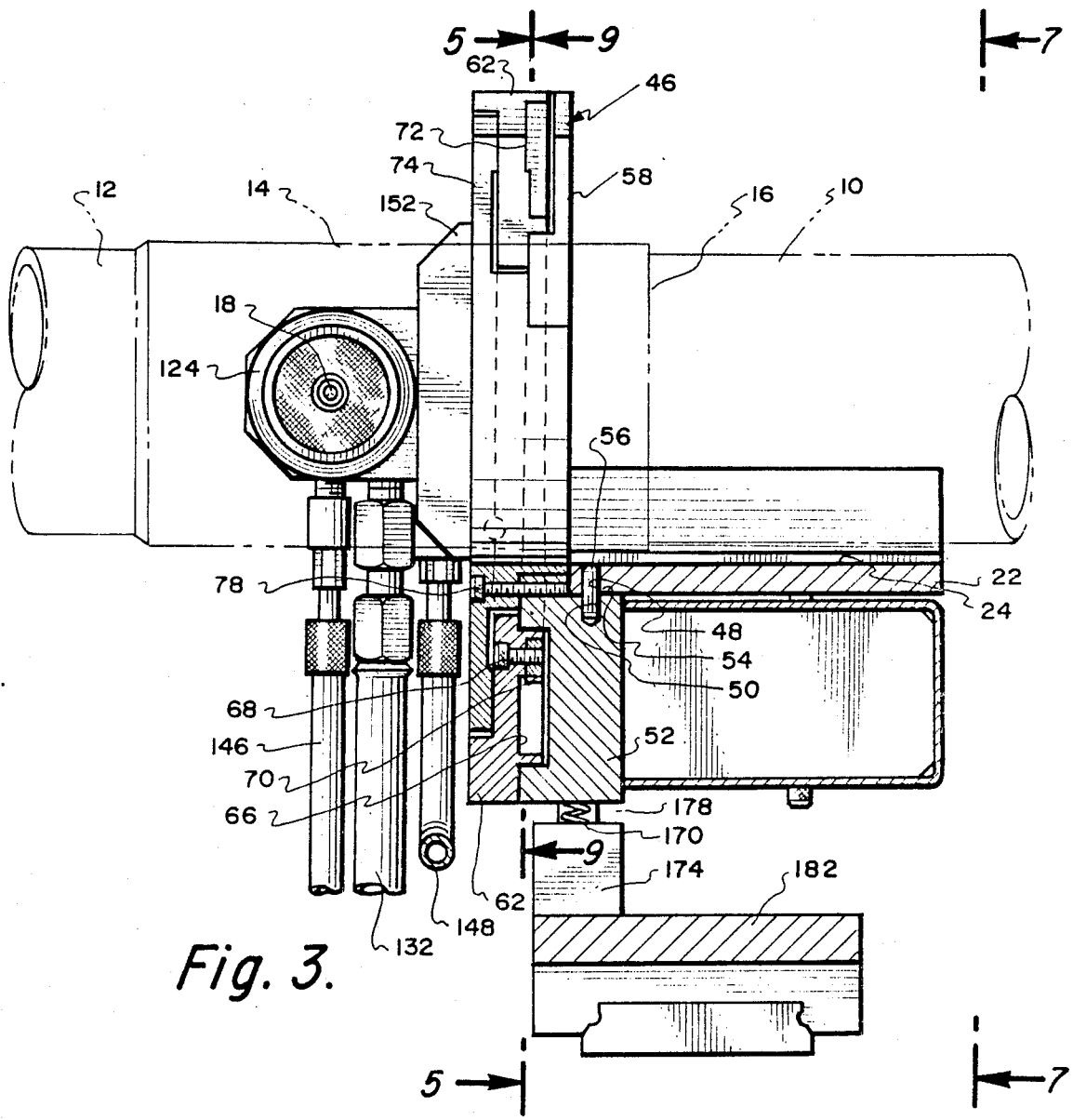
FIG. 3 is a cross-sectional view through the welding apparatus of this invention taken along line 3—3 of FIG. 2.

Referring particularly to the drawings, there is shown a portion of a muffler piping system composed of a thin walled muffler pipe 10 and a thin walled muffler pipe 12. Muffler pipe 12 has an enlarged end forming an annular sleeve 14. One end of the pipe 10 is to be snugly located within the annular sleeve 14. Sealing between the pipe 10 and the sleeve 14 is to occur at edge 16. It is to be noted that within the drawings that edge 16 is not shown being aligned between the welding electrodes 18 and 20. However, in actual practice it is to be understood that this will be the correct position of edge 16.

The pipe 10 is to rest against a vee block 22. The vee block 22 has a concave nesting area 24 within which the pipe 10 is to be located. To secure pipe 10 in position and fix such when located in the nesting area 24, there is to be utilized a separate securing bracket 26. Securing bracket 26 is basically bifurcated forming legs 28 and 30. The legs 28 and 30 are connected together by an apex section 32. The inward surface of the leg 28 includes a recess 34 with a similar recess 36 being located on the inward surface of the leg 30. Formed within the apex section 32 is a threaded hole 38. A conventional bolt fastener 40 is threadably secured within the hole 38.

The vee block 22 includes longitudinal side rails 42 and 44. The recess 34 is to connect with the side rail 42 with the recess 36 connecting with the side rail 44. The bracket 26 is then slid along the rails 42 and 44 to a particular desired longitudinal position. At this time the user then proceeds to turn bolt fastener 40 within the hole 38 until the inner end of the fastener 40 comes into contact with the pipe 10. The user then proceeds to further rotate the bolt fastener 40 thereby applying a force against the pipe 10 tightly holding such within the nesting area 24 of the vee block 22. It is to be understood that this separate bracket 26 will have to be removed from the vee block 22 to permit the pipe 10 to be disengaged from the welding apparatus 46 of this invention.

The vee block 22 has a hole 48 which aligns with a hole 50 of a housing body 52. The housing body 52 includes a lineal ledge 54 within which the hole 50 is formed. The vee block 22 rests on the ledge 54 with a dowel pin 56 connecting the holes 48 and 50. A pair of threaded bolts (not shown) secure together the housing body 52 and the vee block 22.

The housing body 52 includes a narrowed sheet-like section 58 within which is formed an enlarged, centrally disposed, recess 60. The pipe 10 is to be located within this recess 60.

Mounted directly abutting the sheet-like section 58 is a gear body 62. This gear body 62 is capable of sliding movement relative to the sheet-like section 58. The gear body 60 includes an enlarged recess 64 which is of the same size and aligns with recess 60. The gear body 62 includes an annular recess 66. Fixedly mounted by bolt 68 to the gear body 62 is a ring gear 70. The ring gear 70 is located within the annular recess 66. The recess 66 is mounted within the inner face of the gear body 62. Within the outer face of the gear body 62 is located an enlarged annular recess 72.

Mounted within the enlarged annular recess 72 is a plate 74. The plate 74 also has an enlarged recess 76 which aligns with and is the same size as recesses 60 and 64. Plate 74 is fixedly mounted by bolts 78 to housing body 52. However, the gear body 64 is capable of being slidingly moved relative to the plate 74.

Mounted within the recess 66 and fixedly attached to the gear body 62 are a pair of spaced apart actuating buttons 80 and 82. The buttons 80 and 82 are just slightly raised from the surface of the recess 66. The function of these buttons 80 and 82 will be explained further on in this specification.

Located within the recess 66 is a drive gear 84. The drive gear 84 is in continuous engagement with the ring gear 70. The drive gear 84 is fixedly mounted onto a motor shaft 86. The motor shaft 86 is supported by a bearing assembly 88. The bearing assembly 88 is mounted within a chamber 90 of a motor mount spacer 92. This spacer 92 is fixedly secured by appropriate fasteners to the housing body 52. The shaft 86 is connected to and is operated by an electrically driven motor (not shown) mounted within a motor housing 94. The operating of the motor is to be accomplished generally by the use of some type of computer (not shown). The motor within the motor housing 94 will be a reversible motor.

Fixedly mounted on the housing body 52 by means of fasteners 96 is a mounting plate 98. Mounted on the mounting plate 98 is a limit switch housing 100. The limit switch housing 100 includes a movable actuating arm 102. The arm 102 is in continuous contact with a lever 104. The inner end of the lever 104 is pivotally mounted at connection 106 to the housing 100. The outer end of the lever 104 is connected to a wheel 108. The wheel 108 is in continuous contact with the surface of recess 66 of the gear body 62.

In a similar manner, there is mounted by fasteners 110 a mounting plate 112 to the housing body 52. Mounted on the plate 112 is a limit switch housing 114 which is essentially identical to the housing 100. Extending from the lower surface of the housing 114 is a lever 116 the outer end of which is connected to a roller 118. Again, the roller 118 is in continuous contact with the wall surface of the recess 66.

Electrode 18 is fixedly mounted by set screw 120 within a block 122. The block 122 is constructed of electrically conductive material such as copper. The electrode 18 is mounted within a ceramic gas cup 124. Concentrically disposed about a portion of the electrode 18 is a sleeve 126 which is integral with the block 122. The sleeve 126 is threaded and threadably secured thereto is a plug 128. The plug 128 is also externally threaded and is threadably secured in a fixed position with the interior surface of the gas cup 124. There is an annular space provided between the sleeve 126 and the electrode 18 through which an inert gas is to be conducted after being supplied to passage 130 formed within the block 122. The gas is supplied to passage 130 through conduit 132. The inert gas, such as nitrogen, is to be supplied into the conduit 132 from a source (not shown).

Located between the gas cup 124 and the block 122 is a plastic seal 134. The seal 134 functions to prevent leakage of gas between the block 122 and the gas cup 124 and also electrically insulates the gas cup 124 from the block 122.

Electrically connected with the block 122 is a cooling block 136. This cooling block 136 includes a recess 138 within which is mounted in a snug fitting manner the block 122. A set screw 140 securely mounts the cooling block 136 to the block 122.

Within the cooling block 136 is located a water inlet passage 142 and a water outlet passage 144. The water inlet passage 142 is connected to a water supply conduit 146 with the water outlet passage 144 being connected to a water discharge conduit 148. Water is to be supplied continuously through the passages 142 and 144 to discharge excessive heat that is created during the welding process. The block 136 will also be constructed of copper.

The block 136 is fixedly mounted by bolt fasteners 150 to a mounting block 152. The mounting block 152 is in turn fixedly attached by fasteners 154 to the gear body 62.

It is to be understood that the welding electrode 20 is mounted in a similar manner within a gas cup 156 which is mounted on a block 158 which is similar to block 122. The block 158 is mounted on a cooling block 160 which in turn is mounted on a block 162 which is similar to block 152. Block 162 is fixedly mounted onto the gear body 62. It is to be readily apparent, by referring to the drawings, that the electrodes 18 and 20 are located diametrically opposite each other relative to the piping 10 and are also located in a facing relationship. Also, the electrodes 18 and 20 will be equally spaced from the wall surface of the piping 10. Gas is to be supplied to the gas cup 156 by means of conduit 164. Also, water discharge conduit 166 is shown in relation to the cooling block 160.

The housing body 52 has a pair of spaced apart recesses formed within its side surface with only recess 168 being shown. Within each of the recesses 168 is mounted a coil spring 170. The free end of the coil spring 170 fits within a recess 172 (again, only one of two being shown) formed within intermediate base 174. The base 174 is mounted onto the housing body 52 by means of bolts 176. It is to be noted that the bolts 176 are positioned so that the intermediate base 174 is spaced a slight distance, creating gap 178, from the housing body 52. The result is that the housing body 52 is capable of moving a slight distance, determined by the width of the gap 178, relative to the intermediate base 174. The normal at-rest position is when the springs 170 are fully extended which is shown within the drawings. The intermediate base 174 is attached by fasteners 180 to a main supporting base 182. This main supporting base 182 is to be fixed to a fixed structure (not shown).

The operation of the welding apparatus 46 of this invention is as follows: The base 182 is to be mounted onto a fixed structure so that the electrodes 18 and 20 are located in a vertical plane. This means that block 162 will be at a height greater than the block 152. In referring to FIG. 2 of the drawings, the structure shown would have to be rotated ninety degrees in the counterclockwise direction. If desired, block 152 could be at the greater height.

The pipe 10 would then be installed, as previously mentioned, against the vee block 22 with the edge 16 located on the vertical plane extending between the electrodes 18 and 20. At the start of the welding procedure, the welding electrode 20 is activated with welding electrode 18 not being activated. The welding electrode 20 is moved clockwise which is caused by rotation of gear 84 which causes rotation of the ring gear 70. This rotation of the ring gear 70 continues until button 80 connects with roller 108 which lineally moves switch member 102 deactivating the motor which is rotating the gear 84. At this time, the electrical current being supplied to the electrode 20 is deactivated and this electrode 20 is now located in the vertically lower position with the electrode 18 now located in the vertically upper position. At this time, the motor driving gear 84 is reactivated in the opposite direction with electrode 18 now being activated. As a result, electrode 18 is moved one hundred eighty degrees in a counterclockwise direction which creates the remaining one hundred eighty degrees of weld. At this time, the welding electrode 18 is deactivated. A satisfactory weld bead should now be produced with the pipe 10 being securely welded to the pipe 12. The bracket 26 is to be disengaged and the welded pipe to be removed from the welding apparatus 46.

It is possible to mount the electrodes 18 and 20 only ninety degrees apart rather than the one hundred eighty degrees shown. In such an instance, the welding procedure would be different. Assume electrode 18 is pivoted clockwise ninety degrees in FIG. 2 with electrode 20 remaining in its same position. Both electrodes 18 and 20 would be activated simultaneously and pivoted ninety degrees clockwise resulting in welding of the right side, half circular section, of the pipe 10. The electrodes 18 and 20 would then be deactivated and pivoted one hundred eighty degrees counterclockwise with electrode 20 at the greatest height in the vertical plane. The electrodes 18 and 20 are then reactivated and pivoted ninety degrees counterclockwise completing the three hundred sixty degree circular weld of pipe 10.

Figure 4:
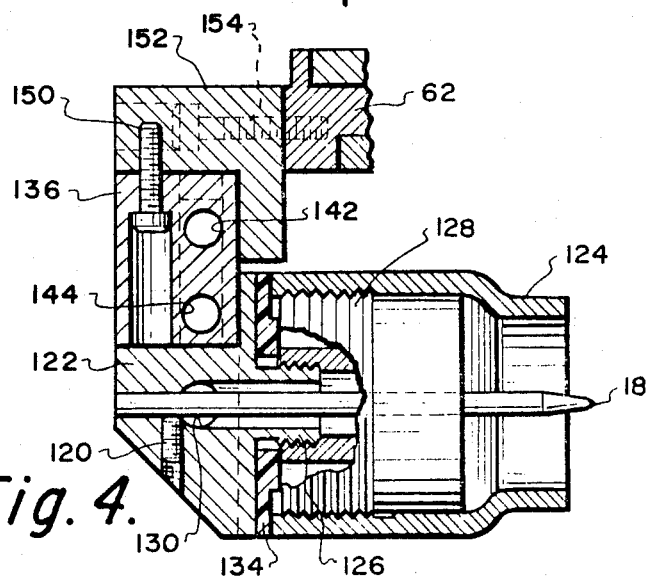
FIG. 4 is a cross-sectional view through one of the welding electrodes utilized in conjunction with the welding apparatus of this invention taken along line 4—4 of FIG. 2.
Figure 5:
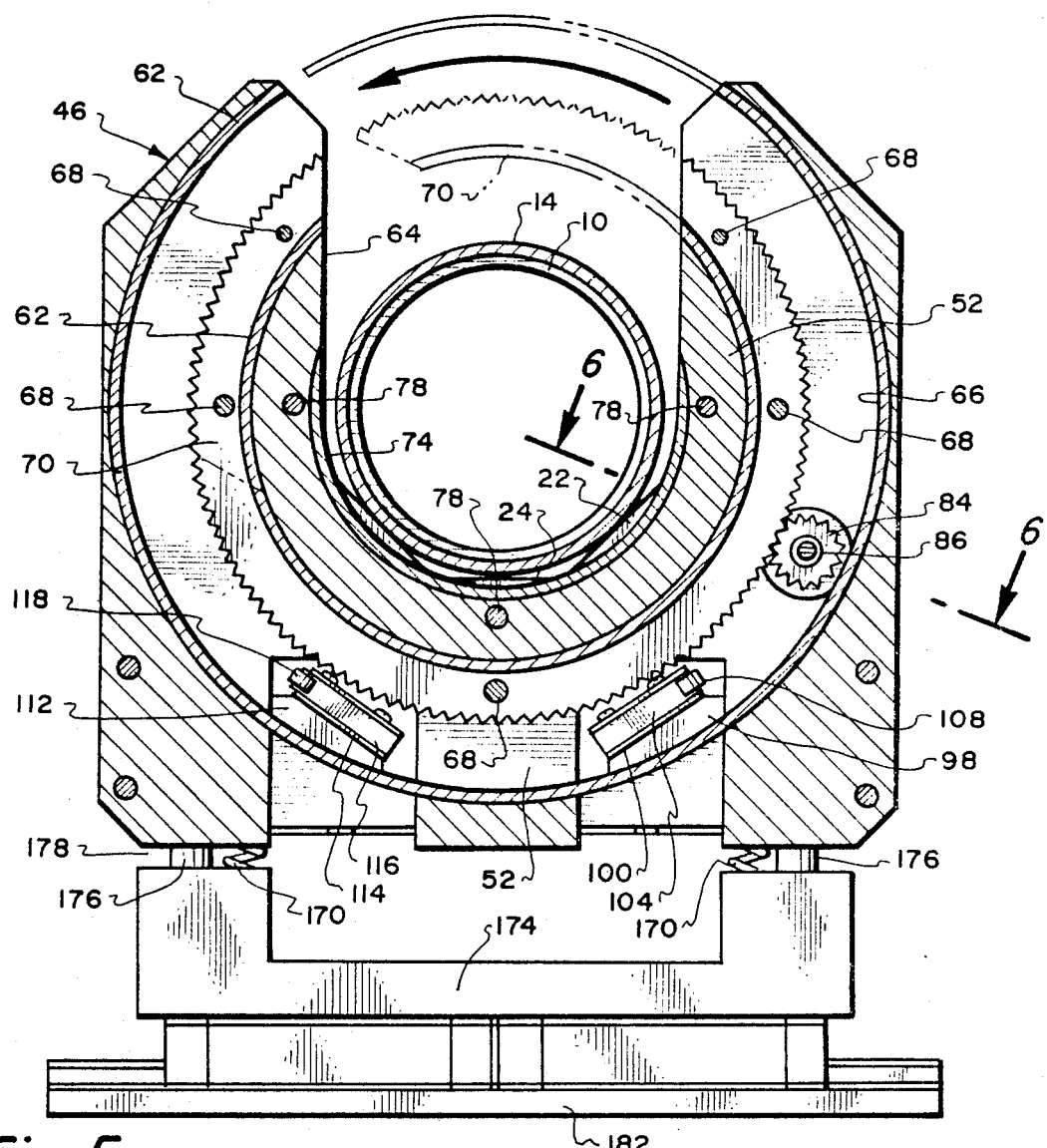
FIG. 5 is a cross-sectional view through the welding head housing of the welding apparatus of this invention taken along line 5—5 of FIG. 3.
Figure 6:
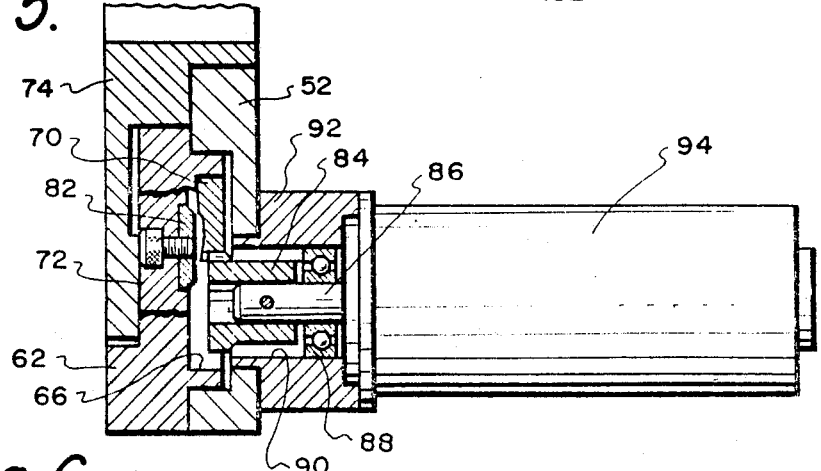
FIG. 6 is a cross-sectional view through the motor mounting structure incorporated within the welding apparatus of this invention taken along line 6—6 of FIG. 5.
Figure 7:
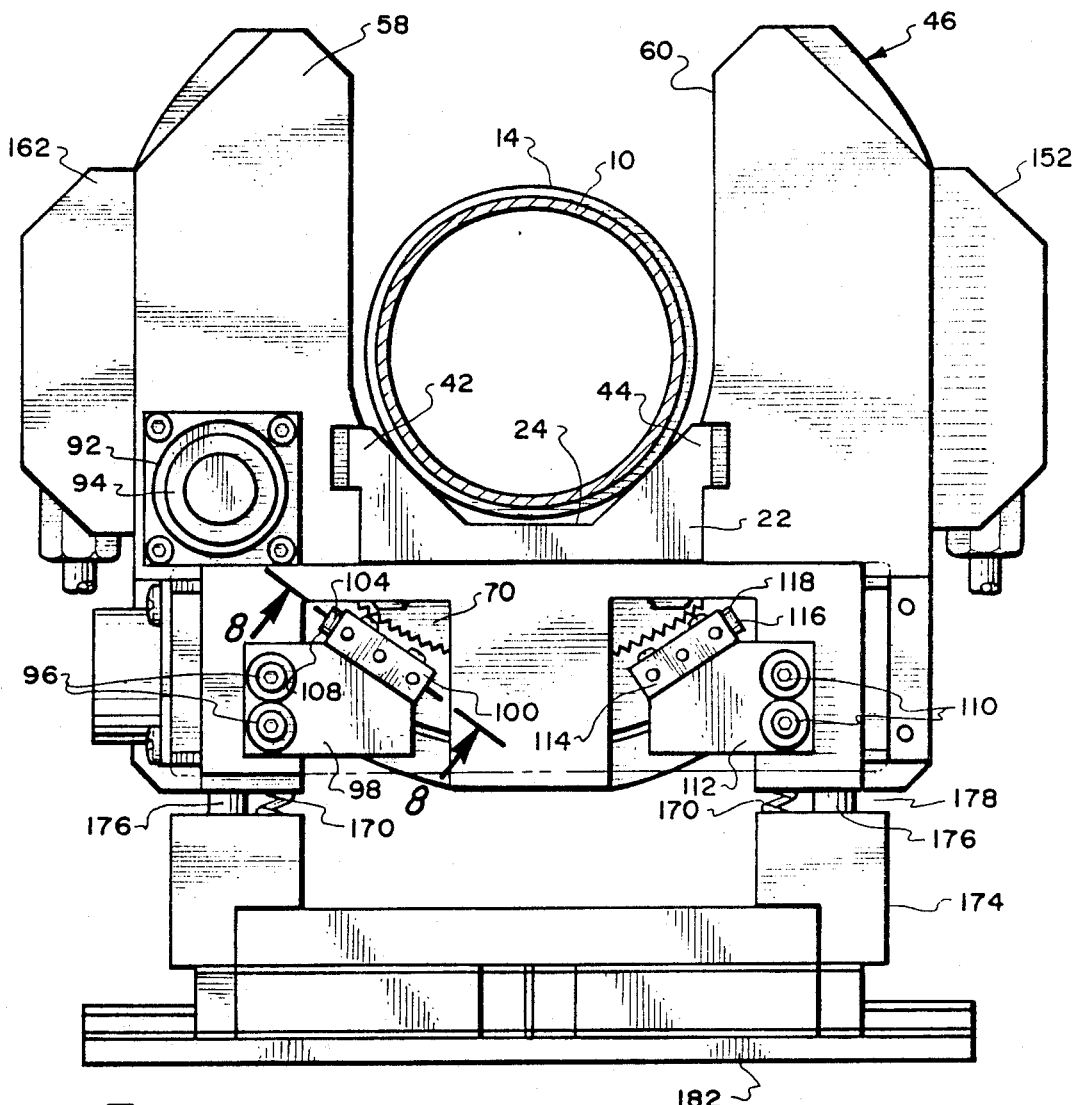
FIG. 7 is a back view of the welding apparatus of this invention taken along line 7—7 of FIG. 3.
Figure 8:
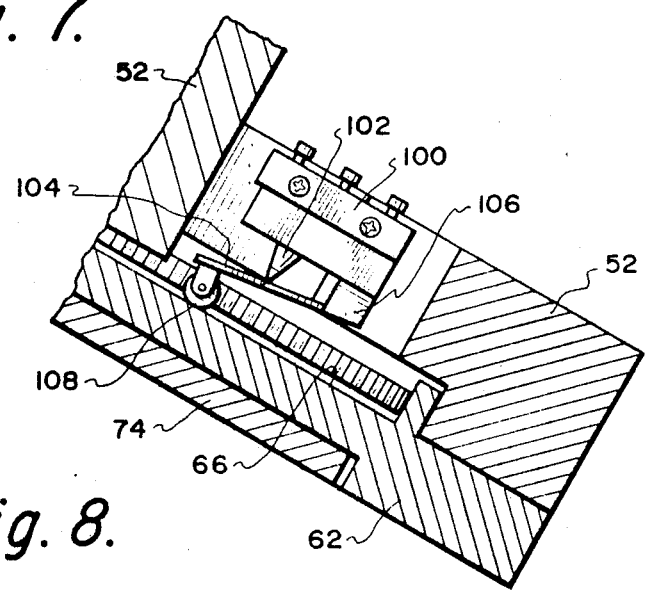
FIG. 8 is a cross-sectional view through one of the micro switches utilized to limit the movement of the welding head apparatus of this invention taken along line 8—8 of FIG. 7.
Figure 9:
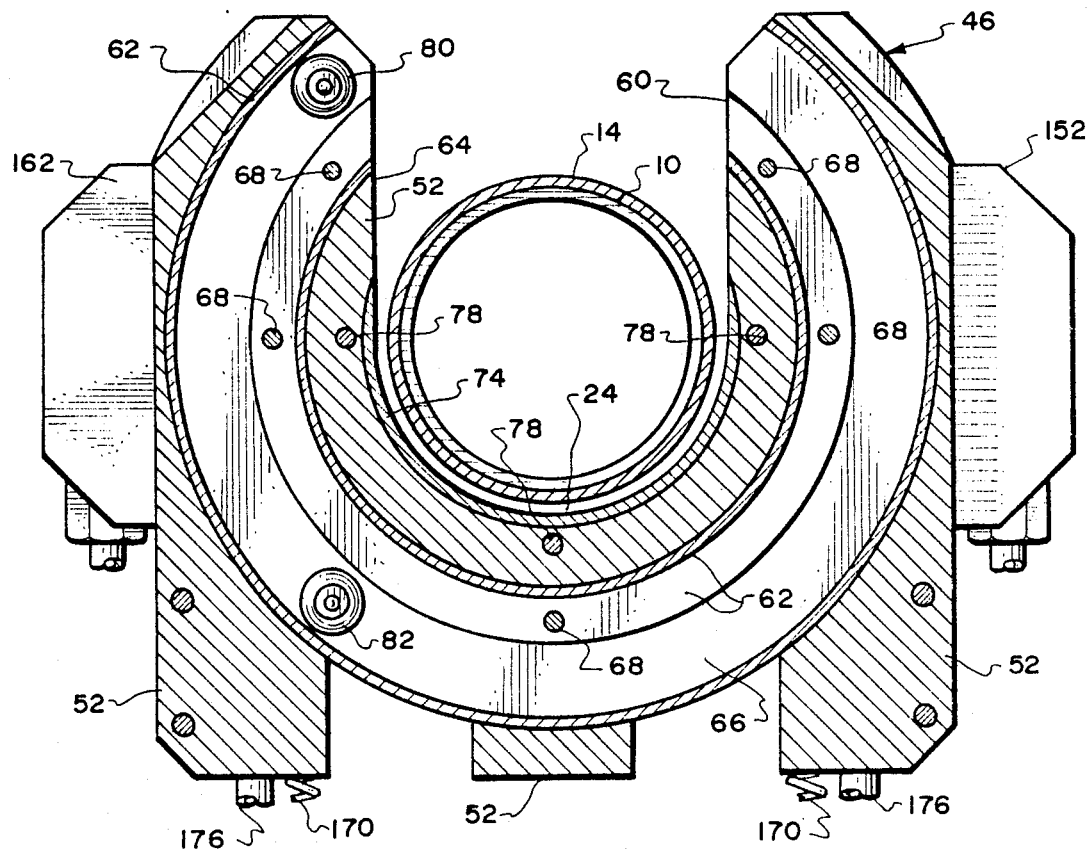
FIG. 9 is a cross-sectional view taken along line 9—9 of FIG. 3 showing in more detail the actuating button arrangement for the micro switches.
Figure 10:
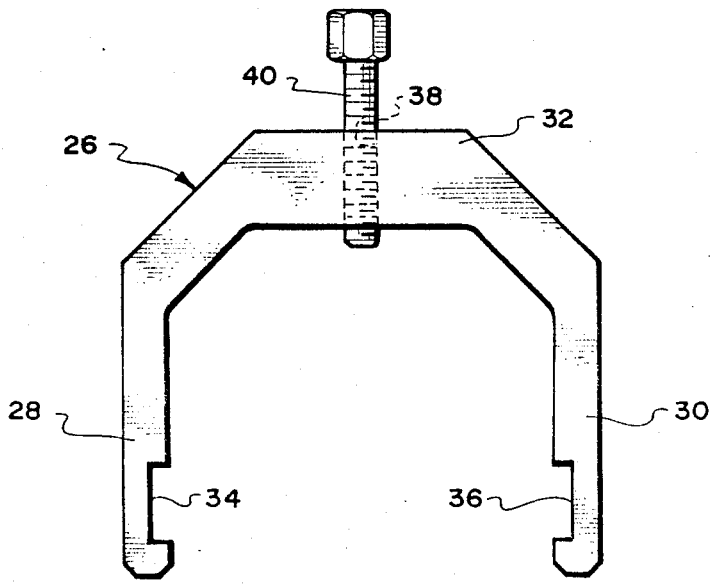
FIG. 10 is a front view of a separate clamp which is utilized to securely hold the pipe to be welded in a fixed position during the welding procedure.

In utilizing of the welding electrode 18, such as shown in FIG. 4 of the drawings, there is required a surge of electrical energy in order to initiate the welding arc. This surge of electrical energy superimposes a high voltage upon the welding circuit. Generally this welding circuit includes a generator which consists of a hot spark-gap oscillator that delivers a high voltage output at radio frequencies. This high frequency generator produces a series of closely space bursts of high voltage energy. This high voltage ionizes the gas between the electrode 18 and the pipes 10 and 14. This ionized gas will then conduct welding current.

The disadvantage of this type of initiating of the welding arc is that radiation from the high frequency generator may interfere with radio wave transmission. Therefore, the use of this type of equipment is governed by regulations of the Federal Communications Commission. If the arc could be initiated without the use of such a high frequency generator, the involvement with such a Government Agency will be eliminated, therefore, eliminating the need for seeking an outside approval to operate such equipment.

Figure 11:
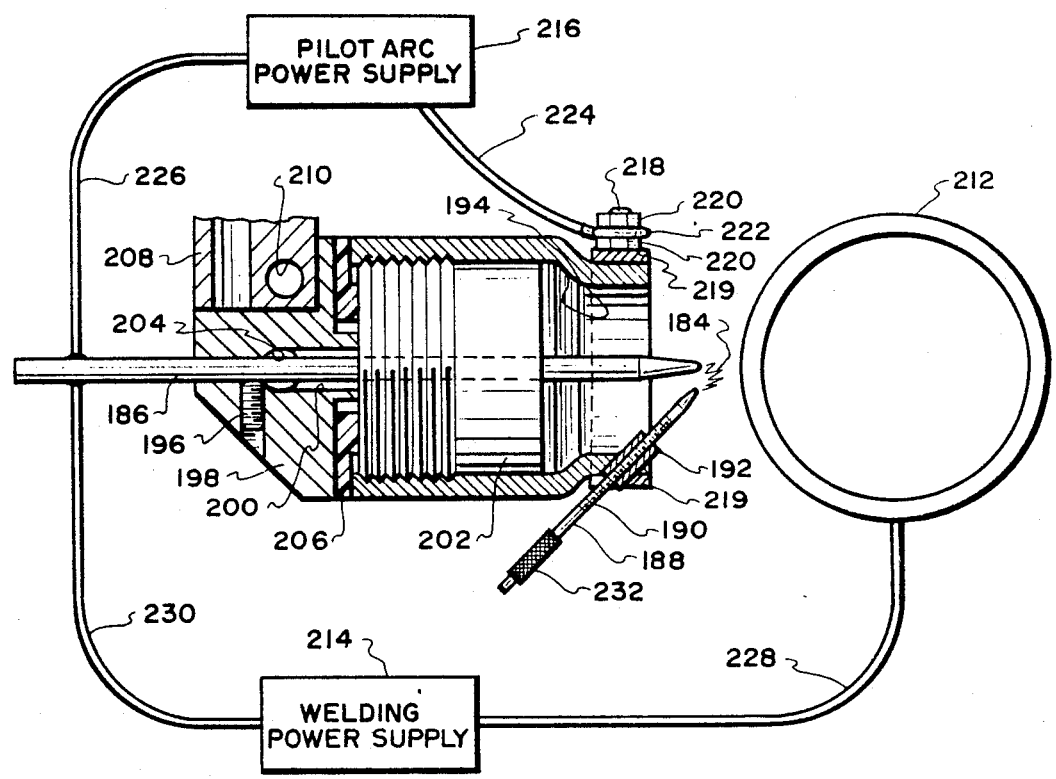
FIG. 11 is a cross-sectional view, similar to FIG. 4, showing a modified form of welding electrode and gas cup which includes a pilot arc.

One way in which the use of a high frequency generator could be eliminated is by using a pilot arc arrangement such as shown in FIG. 11. This pilot arc arrangement utilizes a pilot arc 184 which is operated continuously in a manner analogous to the pilot light of a conventional gas stove. This pilot arc 184 is established between the welding electrode 186 and a pilot electrode 188. The pilot electrode 188 includes a series of screw threads 190 on its exterior surface which are to threadably engage with a mounting sleeve 192. The mounting sleeve 192 is mounted within a metallic gas cup 194. This gas cup 194 also functions as an anode ring.

Electrode 186 is fixedly mounted by set screw 196 within block 198. The block 198 is constructed of an electrically conductive material such as copper. The electrode 186 is centrally mounted within the gas cup 194. Electrode 186 passes through a passage 200 formed within the block 198. Threadably secured within the gas cup 194 is a plug 202. Gas is to be supplied into passage 200 or connecting passage 204. Gas is to be supplied through the passages 204 and 200 to be discharged directly adjacent the tip of the welding electrode 186.

Located between the gas cup 194 and the block 198 is a plastic seal 206. The seal 206 functions to prevent leakage of gas between the block 198 and the gas cup 194 and also electrically insulates the gas cup 194 from block 198. Electrically connected with the block 198 is a cooling block 208. Within the cooling block 208 is located a pair of water cooling passages with only passage 210 being shown.

Between the workpiece to be welded, in the form of pipe 212, and the welding electrode 186 is electrically provided a welding power supply 214. Electrically connected also between the electrode 186 and the gas cup 194 is a pilot arc power supply 216. Mounted on the gas cup 194 is a threaded connector 218 upon which are mounted a pair of fastening nuts 220 between which is tightly bound a connector 222 of a conductor 224. Threaded connector 218 is fixedly secured onto metallic ring 219 which is tightly clamped onto gas cup 194. The conductor 224 connects to the pilot arc power supply 216. The connection from the pilot arc power supply 216 to the welding electrode 186 is by means of conductor 226. A conductor 228 connects the welding power supply to the workpiece 212. A conductor 230 connects the welding power supply 214 to the welding electrode 186.

During the time that the welding power supply 214 is activated and is deactivated, the pilot arc power supply 216 will be activated with the result of the arc 184 is continuously produced. Adjustment of the pilot electrode 188 is provided by manually turning the electrode 188 at knurled area 232 which moves the electrode 188 closer or farther away from the welding electrode 186. With the arc 184 being maintained, it is only necessary to initiate the normal voltage level from the welding power supply 214 which will cause the welding to occur between the welding electrode 186 and the workpiece 212.

What is claimed is:

1. A pipe welding apparatus comprising:
    a mounting base adapted to be mounted onto a fixed structure;
    a welding head housing mounted on said mounting base, said welding head housing having a central enlarged recess with access into said central enlarged recess being from above said welding head housing, pipe support means mounted within said central enlarged recess, said pipe support means adapted to support a pipe to be welded with the pipe resting on said pipe support means; and
    a pair of welding electrodes mounted on said welding head housing, said welding electrodes being oriented diametrically opposite each other relative to the pipe to be welded, said welding electrodes being mounted on a ring gear, said welding electrodes to move in unison, said ring gear being movable relative to said welding head housing, each said welding electrode to be operated to weld only during movement from an upper position to a lower position, said upper position being one hundred eighty degrees spaced from said lower position relative to the diameter of the pipe, both said upper position and said lower position being located on a single vertical plane extending through the center of the pipe to be welded.

2. The pipe welding apparatus as defined in claim 1 including:
    spring means mounted between said mounting base and said welding head housing, said welding head housing being capable of a limited amount of movement against the bias of said spring means relative to said welding head housing.

3. The pipe welding apparatus as defined in claim 2 wherein:
    said pipe support means comprising a vee block, said vee block being mounted at the lower end of said central enlarged recess, a separate securing bracket capable of interlocking with said vee block, said separate securing bracket to be installed in position to fix the position of the pipe that is to be welded when resting on said vee block.

4. The pipe welding apparatus as defined in claim 3 including:
    a pilot arc electrode located directly adjacent each said welding electrode with there being a separate said pilot arc electrode for each said welding electrode, a pilot arc being generated between each said welding electrode and its respective said pilot arc electrode, each said pilot arc being generated while its respective said welding electrode is not operating.

5. The pipe welding apparatus as defined in claim 4 wherein:
    each said pilot arc electrode being adjustably mounted relative to its respective said welding electrode to thereby vary the spacing therebetween.

* * * * *